United States Patent [19]

Uehara

[11] Patent Number: 5,113,495
[45] Date of Patent: May 12, 1992

[54] INTERCOMMUNICATING AMONG A PLURALITY OF PROCESSORS BASED UPON THE IDENTIFICATION OF THE SOURCE WITHOUT USING THE IDENTIFICATION OF THE DESTINATION

[75] Inventor: Izushi Uehara, Tokyo, Japan

[73] Assignee: NEC Corporation, Tokyo, Japan

[21] Appl. No.: 361,559

[22] Filed: Jun. 5, 1989

[30] Foreign Application Priority Data

Jun. 3, 1988 [JP] Japan .................. 63-135725

[51] Int. Cl.⁵ .................. G06F 13/14; G06F 13/18
[52] U.S. Cl. .................. 395/200; 364/DIG. 1;
364/222.2; 364/260; 364/284.3; 364/919.5;
340/825.52
[58] Field of Search ... 364/200 MS File, 900 MS File;
340/825.52, 825.07

[56] References Cited

U.S. PATENT DOCUMENTS

| | | | |
|---|---|---|---|
| 4,223,380 | 9/1980 | Antonaccio et al. | 364/200 |
| 4,296,466 | 10/1981 | Guyer et al. | 364/200 |
| 4,511,958 | 4/1985 | Funk | 364/200 |
| 4,660,141 | 4/1987 | Ceccon et al. | 364/200 |
| 4,667,287 | 5/1987 | Allen et al. | 364/200 |
| 4,692,860 | 9/1987 | Anderson | 364/200 |
| 4,730,251 | 3/1988 | Aakre et al. | 364/200 |
| 4,852,021 | 7/1989 | Inoue et al. | 364/200 |
| 4,860,003 | 8/1989 | DeLuca et al. | 340/825.44 |
| 4,876,664 | 10/1989 | Bittorf et al. | 364/900 |
| 4,888,683 | 12/1989 | Koizumi | 364/200 |
| 4,894,826 | 1/1990 | Aggers et al. | 370/85.1 |
| 4,910,506 | 3/1990 | Yoshida et al. | 340/825.07 |
| 4,912,627 | 3/1990 | Ashkin et al. | 364/200 |
| 4,953,072 | 8/1990 | Williams | 364/200 |

Primary Examiner—Thomas C. Lee
Assistant Examiner—Krisna Lim
Attorney, Agent, or Firm—Foley & Lardner

[57] ABSTRACT

In an intercommunication network for use in transmitting a transmission request from a first processor to a second processor, the first processor sends a first processor number preassigned thereto through a system bus to the second processor which holds a communicable processor number corresponding to the first processor number and which detects whether or not the first processor number indicates the first processor by monitoring correspondence between the first processor number and the communicable processor number. A destination processor number assigned to the second processor may not be transmitted from the first processor because identification is made in the second processor. Thus, no destination processor number is administrated in the first processor. The first and the second processors may belong to a lower rank and an upper rank, respectively, and may be an input/output processor and an execution processor unit, respectively.

4 Claims, 4 Drawing Sheets

INTERCOMMUNICATING AMONG A PLURALITY OF PROCESSORS BASED UPON THE IDENTIFICATION OF THE SOURCE WITHOUT USING THE IDENTIFICATION OF THE DESTINATION

BACKGROUND OF THE INVENTION

This invention relates to an intercommunication network for use in carrying out communication among a plurality of processors, such as execution processor units, input/output processors, and the like, which are connected to one another through a system bus to form a multiprocessor system.

In a conventional intercommunication network of the type described, a plurality of processors are classifiable into an upper rank one composed of execution processing units and a lower rank one composed of input/output processors and the like. Therefore, the execution processing units and the input/output processors will be hereinunder called upper and lower rank processors, respectively, when they are distinguished from each other.

In general, when a transmission or communication request takes place at a first one of the processors used as a transmission end or source to start communication with a second one of the processors that is operable as a reception or destination end, the first processor supplies the bus with a processor number preassigned to the second processor in addition to an intercommunication command. In this connection, such a processor number may be referred to as a destination processor number. Each of the processors always monitors the destination processor number on the bus to detect whether or not the destination processor number is destined to each processor. To this end, the destination processor number is compared with a preassigned processor number assigned to each processor. In the above-mentioned example, the second processor alone receives and detects the destination processor number to judge that the destination processor number is destined to the second processor. Thereafter, the second processor supplies an interruption request to a control circuit operable in accordance with firmware. As a result, the second processor is put into a communicable state with the first processor.

An intercommunication network of the above-mentioned type is very effective to carry out intercommunication between processors, such as execution processor units, both of which belong to the same rank and which do not have a master-slave relationship.

On the other hand, it often happens that similar intercommunication is carried out between an upper rank processor and a lower rank processor. In this event, a transmission end transmits a destination processor number to a reception end like in the intercommunication between the execution processor units.

More specifically, when the upper rank processor and the lower rank processor act as the transmission and the reception ends, respectively, so as to transfer a communication signal from the upper rank processor to the lower rank one, the upper rank processor supplies the lower rank processor with a destination processor number assigned to the lower rank processor. Thus, each upper rank processor is communicable with all the lower rank processors by specifying the lower rank processors by the destination processor number.

To the contrary, when a communication request takes place at a lower rank processor which is operable as the transmission end, so as to transfer a data signal sequence to be processed by the upper rank processors, the lower rank processor produces a destination processor number assigned to a selected one of the upper rank processors to indicate the selected upper rank processor. However, it is to be noted that the data signal sequence produced from the lower rank processor may be often processed in any one of the upper rank processors, if each of the upper rank processors can carry out processing in similar manners. In this event, it is not always desirable to specify a selected one of the upper rank processors by producing the destination processor number preassigned to the selected upper rank processor and to monitor a state of the selected upper rank processor in the lower rank processor. Specifically, each lower rank processor should always be conscious of a destination processor number communicable with each lower rank processor and must transmit such a destination processor number on transmission of the transmission request. Therefore, each lower rank processor must be formed by the use of complexed hardware and firmware and should bear comparatively heavy load.

SUMMARY OF THE INVENTION

It is an object of this invention to provide an intercommunication network wherein each lower rank processor may be structured by the use of simple hardware and firmware.

It is another object of this invention to provide an intercommunication network of the type described, which can alleviate load in each lower rank processor.

It is still another object of this invention to provide an intercommunication network of the type described, wherein a transmission source may not be conscious of a destination processor number.

An intercommunication network to which this invention is applicable is for use in carrying out communication among a plurality of processors in a multiprocessor system. The processors are connected to one another through a system bus and comprise first and second processors which have first and second preassigned processor numbers assigned thereto, respectively, and which are operable as a transmission source for transmitting a transmission request and a destination end for receiving the transmission request, respectively. The first processor comprises producing means for producing the first preassigned processor number assigned to the first processor and sending means for sending the first preassigned processor number as a transmission source number on transmission of the transmission request to the system bus. The second processor comprises holding means for holding a communicable processor number corresponding to the first preassigned processor number and detecting means coupled to the system bus and the holding means for detecting whether or not the transmission source number indicates the first processor by checking correspondence between the transmission source number and the communicable processor number. The detecting means produces an interruption request signal when both the transmission source number and the communicable processor number indicate the first processor.

DESCRIPTION OF THE PREFERRED EMBODIMENT

Figure 1:
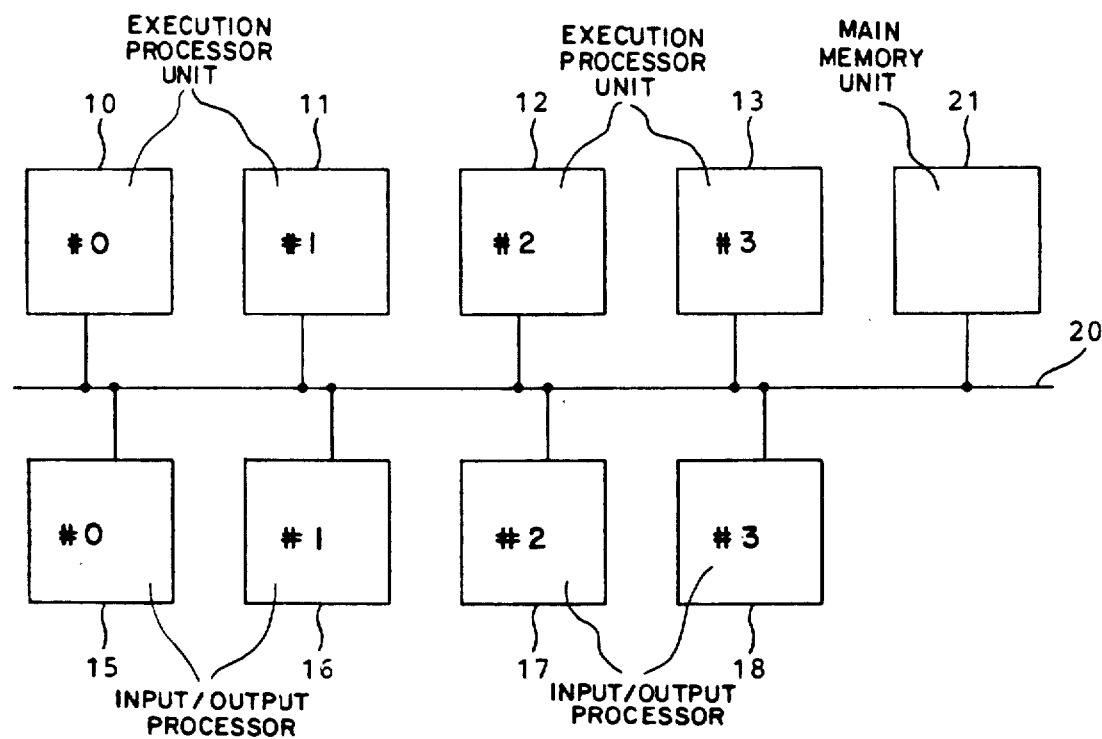
FIG. 1 is a block diagram of an intercommunication network to which this invention is applicable.

Referring to FIG. 1, an intercommunication network to which this invention is applicable comprises zeroth through third execution processor units (EPU) 10, 11, 12, and 13, and zeroth through third input/output processors (IOP) 15, 16, 17, and 18 connected through a system bus 20 to one another and to the zeroth through third execution processor units 10 to 13. In addition, a main memory unit 21 is also connected to the system bus 20 to be used in common to the zeroth through third execution processor units 10 to 13 and the zeroth through third input/output processors 15 to 18. The zeroth through third execution processor units 10 to 13 are operable as upper rank processors relative to the input/output processors 15 to 18, while the input/output processors 15 to 18, lower rank processors. At any rate, the execution processor units 10 to 13 and the input/output processors 15 to 18 form a multiprocessor system along with the system bus 20 and the main memory unit 21.

Herein, it is assumed that the zeroth through third execution processor units 10 to 13 of the upper rank are assigned with zeroth through third primary processor numbers represented by binary numbers (0000), (0001), (0010), and (0011), respectively, while the zeroth through third input/output processors 15 to 18 of the lower rank are assigned with zeroth through third subsidiary processor numbers represented by (0100), (0101), (0110), and (0111), respectively. In addition, each of the zeroth through third execution processor units 10 to 13 is assumed to be similar in structure and operation to one another while each of the zeroth through third input/output processors is assumed to be also similar in structure and operation to one another.

In the illustrated intercommunication network, intercommunication is classified into first intercommunication between the execution processor units 10 to 13, second intercommunication from one of the execution processor units 10 to 13 to one of the input/output processors 15 to 18, and third intercommunication from one of the input/output processors 15 to 18 to one of the execution processor units 10 to 13. The first and the second intercommunication may be carried out in a conventional manner, as will become clear. However, the third intercommunication will be carried out in a manner different from the conventional manner, as will later be described in detail. In addition, each of the execution processor units 10 to 13 and the input/output processors 15 to 18 communicate with the main memory unit 21 through the system bus 20.

Figure 2:
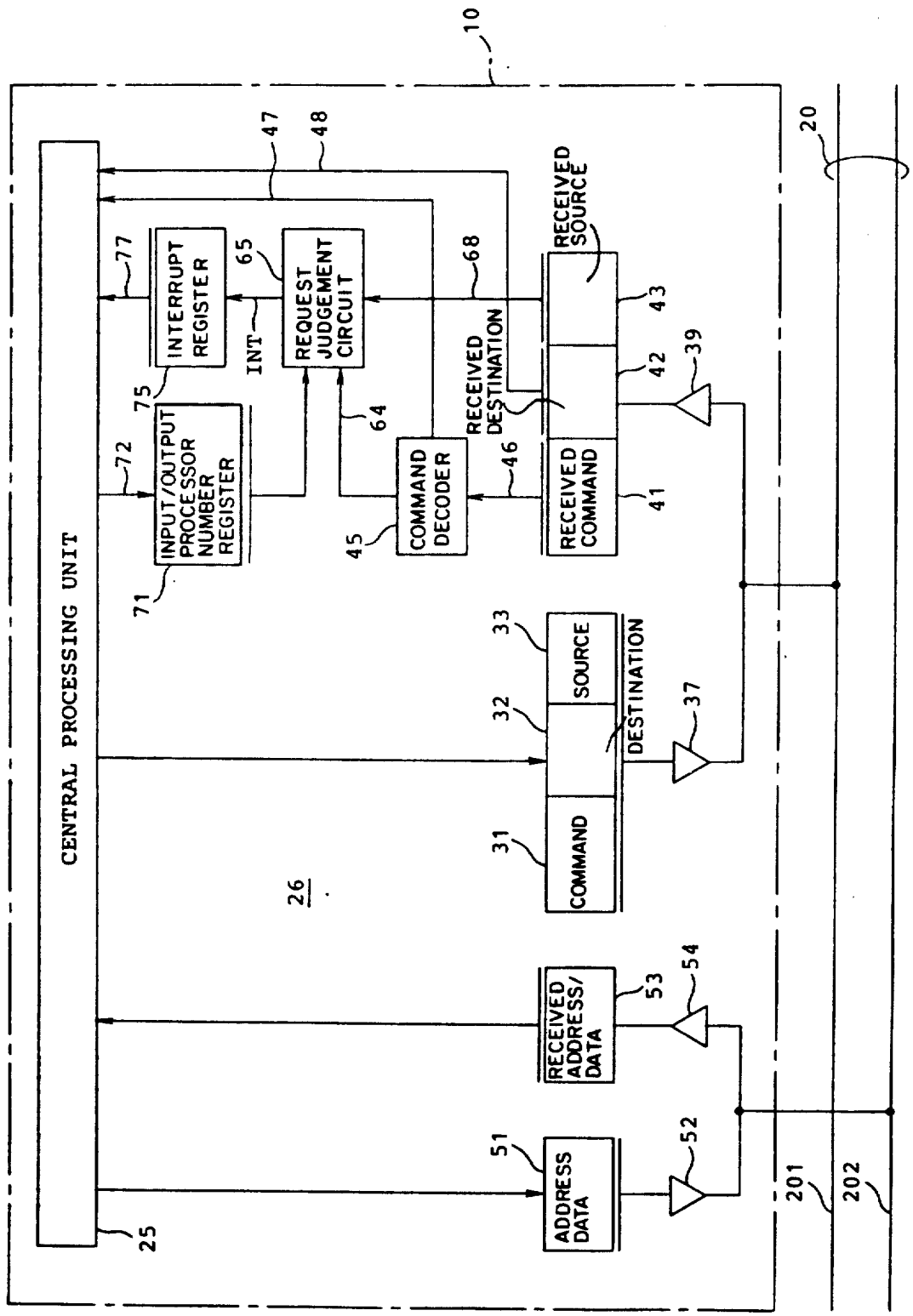
FIG. 2 is a block diagram of an execution processor unit according to a preferred embodiment of this invention.

Referring to FIG. 2 together with FIG. 1, the zeroth execution processor unit 10 is exemplified as a representative of the zeroth through third execution processor units 10 to 13 and comprises a central processing unit 25 and a bus interface circuit 26 connected to the central processing unit 25 and the system bus 20. The illustrated system bus 20 comprises a command bus 201 and an address/data bus 202 each of which is composed of a plurality of bus lines, although each bus is represented only by a single line.

In FIG. 2, it is assumed that the first intercommunication is carried out between the execution processor units 10 to 13 and that the illustrated zeroth execution processor unit 10 is operable as a transmission end or a transmission source and communicates with a selected one of the other execution processor units that may be called a destination or reception end. The first intercommunication may be similar to that of a conventional network. More specifically, the zeroth processor unit 10 at first issues a communication or transmission request to identify the destination end or processor. The communication request is specified by a command signal CMD representative of a command and a specific one of the zeroth through third primary processor numbers that is assigned to the destination end and that may be called a destination processor number DEST. In this event, the command indicates the first intercommunication. In addition, the communication request also indicates a source processor number SRC, namely, the zeroth primary processor number (0000). The command signal CMD, the destination processor number DEST, and the source processor number SRC are sent from the central processing unit 25 to a command register 31, a destination number register 32, and a source number register 33 through a first internal line 36 to be kept in the respective registers 31, 32, and 33, respectively. The command signal CMD, the destination processor number DEST, and the source processor number SRC are delivered from the command register 31, the destination number register 32, and the source number register 33 through a first driver 37 to the command bus 201. Thus, the communication request is sent to all of the other processors through the command bus 201.

When the illustrated zeroth execution processor unit 10 is operable as a destination end in the first intercommunication, a command signal CMD, a destination processor number DEST, and a source processor number SRC are received and held through the command bus 201 and a first receiver 39 as a received command signal RCMD, a received destination processor number RDEST, and a received source processor number RSRC by a reception command register 41, a reception destination number register 42, and a reception source number register 43, respectively. The received command signal RCMD is sent from the reception command register 41 to a command decoder 45 through an internal command line 46.

If the received command signal RCMD is judged to be representative of the first intercommunication, the command decoder 45 sends a logic "1" level signal to the central processing unit 25 through a second internal line 47. On the other hand, the received destination processor number RDEST is sent from the reception destination number register 42 to the central processing unit 25 through a third internal line 48. Supplied with the logic "1" level signal and the received destination processor number RDEST from the command decoder 45 and the reception destination number register 42, respectively, the central processing unit 25 detects the first intercommunication and compares the received destination processor number RDEST with the zeroth primary processor number (0000) assigned to the zeroth execution processor unit 10. If the received destination processor number RDEST is coincident with the zeroth primary processor number (0000), the central processing unit 25 of the zeroth execution processor unit 10 judges that the communication request in question is destined to the zeroth execution processor unit 10. Such judgement may be made in a usual manner and will not be described any longer.

Thereafter, the first intercommunication is carried out between the execution processor units 10 to 13 in the manner known in the art by transferring a sequence of data signals from one of the execution processor units 10 to 13 to another. On transferring the data signal sequence, the illustrated execution processor unit 10 sets the data signal sequence from the central processing unit 25 to an address/data register 51. Subsequently, the data signal sequence is delivered from the address/data register 51 to the address/data bus 202 through the second driver 52. To the contrary, a reception data signal sequence is sent from the address/data bus 202 to a reception address/data register 53 through a second receiver 54 on receiving the reception data signal sequence and is thereafter delivered to the central processing unit 25. Similar data transfer is carried out in the second and the third intercommunication by the use of the address/data register 51 and the reception address/data register 53 also.

The address/data register 51, the second driver 52, the reception address/data register 53, and the second receiver 54 are used not only in the first through third intercommunication but also in a data transfer operation between each execution processor unit 10 to 13 and the main memory unit 21 (FIG. 1). On such a data transfer operation between each execution processor unit 10 to 13 and the main memory unit 21, each of the address/data register 51 and the reception address/data register 53 is loaded with an address signal and a data signal.

In the second intercommunication from each of the zeroth through third execution processor units 10 to 13 of the upper rank to either one of the zeroth through third input/output processors 15 to 18 of the lower rank, each execution processor unit 10 to 13 supplies the command bus 201 with the command signal CMD, the destination processor number DEST, and the source processor number SRC like in the first intercommunication mentioned before. In this event, it is to be noted that the command signal CMD is indicative of the second intercommunication while the destination processor number DEST specifies either one of the zeroth through third input/output processors 15 to 18.

In FIGS. 1 and 2, let the third intercommunication be carried out from either one of the zeroth through third input/output processors 15 to 18 to a selected one of the zeroth through third execution processor units 10 to 13 that may be assumed to be the zeroth execution processor unit 10 without loss of generality.

Figure 3:
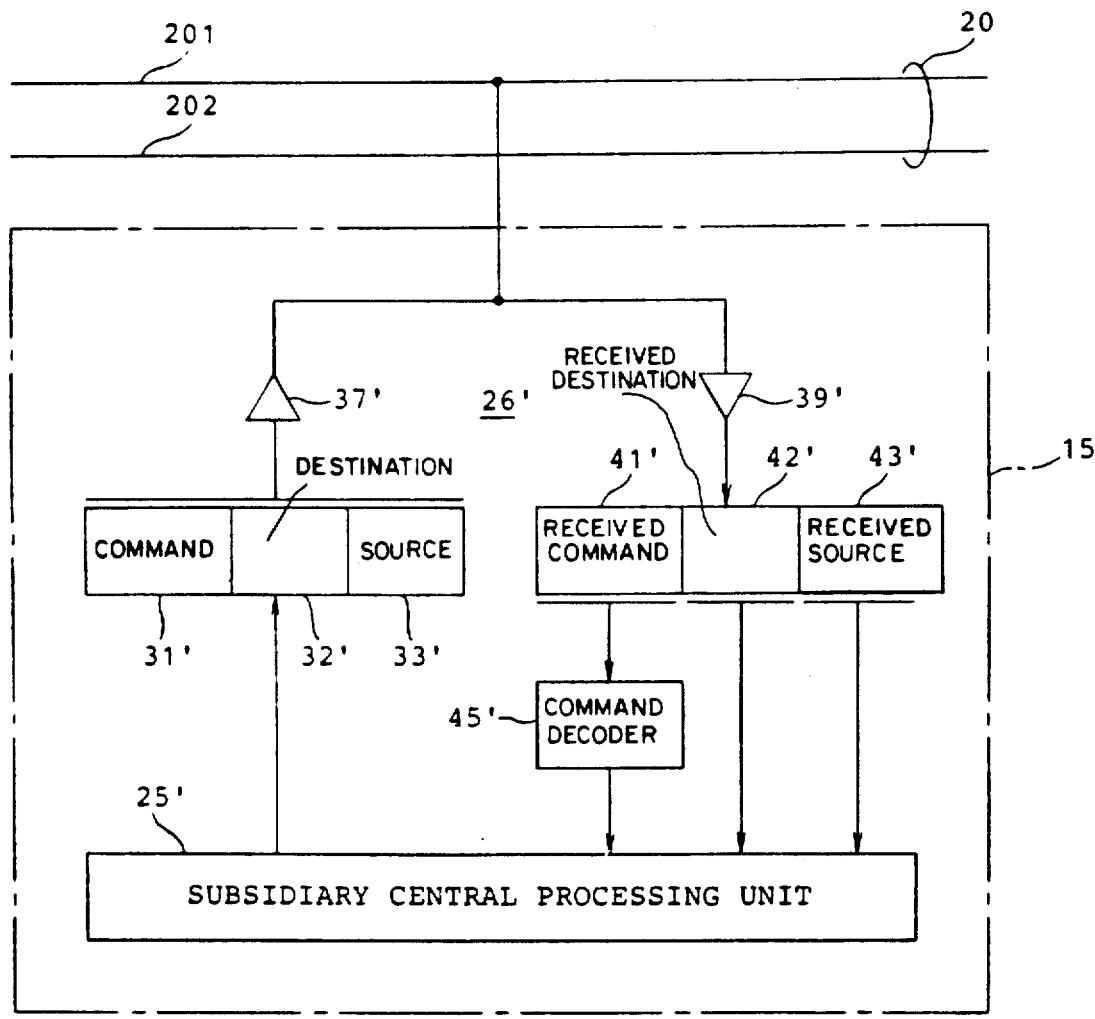
FIG. 3 is a block diagram of an input/output processor communicable with the execution processor unit illustrated in FIG. 2.

Temporarily referring to FIG. 3, each input/output processor 15 to 18 is similar in structure and operation to one another and is therefore exemplified by the zeroth input/output processor 15. The zeroth input/output processor 15 comprises a subsidiary central processing unit 25' and a subsidiary bus interface unit 26'. The subsidiary central processing unit 25' may be simple in structure and operation in comparison with a conventional one, as will become clear as the description proceeds.

The subsidiary bus interface unit 26' comprises a command register 31', a destination processor number register 32', a source processor number register 33', a reception command register 41', a reception destination processor number register 42', and a reception source processor number register 43' which correspond to those of FIG. 2, respectively. In addition, a command decoder 45' is also included in the subsidiary bus interface unit 26' in correspondence to the command decoder 45 illustrated in FIG. 2. All of the above-mentioned elements are known in the art and are therefore not shown in FIG. 2.

On carrying out the third intercommunication, the zeroth input/output processor 15 supplies the command bus 201 with a command signal CMD and a source processor number SRC through a driver 37'. In this case, the command signal CMD specifies the third communication while the source processor number SRC specifies the zeroth subsidiary processor number (0100). The command signal CMD and the source processor number SRC are delivered from the command register 31' and the source processor number register 33' through the driver 37' to the command bus 201. Accordingly, the source processor number register 33' is operable to produce the source processor number SRC while the driver 37' is operable to send the source processor number SRC to the system bus 201.

Moreover, a dummy number is also sent instead of the destination processor number DEST from the destination processor number register 32 even in the third intercommunication. The dummy number is not actually used as the destination is processor number DEST when the destination one of the execution processor units 10 to 13, as will become clear.

In FIGS. 2 and 3, let predetermined relationships be present between the zeroth through third input/output processors 15 to 18 and the zeroth through third execution processor units 10 to 13 on carrying out the third intercommunication. In other words, dependencies of the zeroth through third input/output processors 15 to 18 are predetermined for the zeroth through third execution processor units 10 to 13. For example, the zeroth input/output processor 15 is assumed to be communicable only with the zeroth execution processor unit 10 in the third intercommunication. Such dependencies of the zeroth through third input/output processors 15 to 18 are monitored by the zeroth through third execution processor units 10 to 13. As a result, each of the zeroth through third execution processor units 10 to 13 identifies the input/output processor which is communicable with each execution processor unit 10 to 13 in a manner to be described later.

Now, it is assumed that the communication request is issued from the zeroth input/output processor unit 15 to the zeroth execution processor unit 10 to carry out the third intercommunication. In this event, the zeroth input/output processor 15 acts as the transmission end or transmission source while the zeroth execution processor unit 10 acts as the destination or reception end. The communication request in the third intercommunication is specified by the command signal CMD representative of the third intercommunication and the source processor number SRC, namely, (0100) representative of the zeroth input/output processor 15. The command signal CMD and the source processor number SRC are sent from the command register 31' and the source processor number register 33' of the zeroth input/output processor 15 to the command bus 201. As mentioned before, the dummy number is also sent from the destination processor number register 32' to the command bus 201.

In FIG. 2, the command signal CMD and the source processor number SRC are delivered from the command bus 201 to each of the zeroth through third execution processor units 10 to 13. In the zeroth execution processor unit 10, the command signal CMD and the source processor number SRC are kept as the received command signal RCMD and the received source processor number RSRC in the reception command register 41 and the reception source number register 43, respectively. The dummy number is also held as the received destination processor number RDEST in the reception destination number register 42.

The received command signal RCMD is sent from the reception command register 41 to the command decoder 45. When the command decoder 45 judges that the received command signal RCMD indicates the third intercommunication, the command decoder 45 produces an indication signal of the logic "1" level representative of the third intercommunication.

Figure 4:
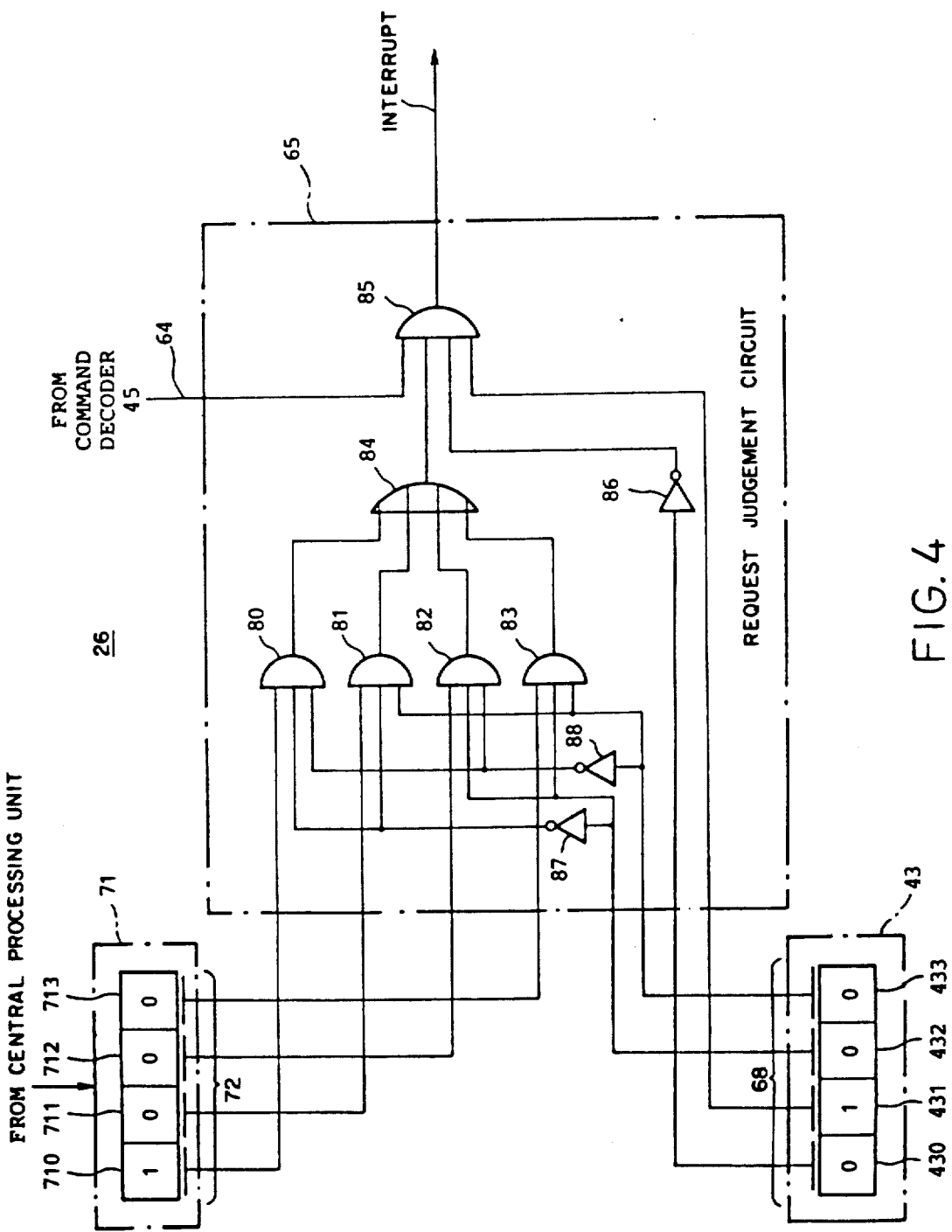
FIG. 4 is a block diagram of a portion of the execution processor unit illustrated in FIG. 2.

Referring to FIG. 4 together with FIG. 2, the indication signal is sent from the command decoder 45 through a fourth internal line 64 to a request judgement circuit 65. The request judgement circuit 65 is supplied with the received source processor number RSRC from the reception source number register 43 through a fifth internal line 68. Furthermore, the illustrated bus interface circuit 26 comprises an input/output processor number (IOPN) register 71 connected to the central processing unit 25 through a sixth internal line 72. The IOPN register 71 is loaded under control of the central processing unit 25 with a communicable processor number which corresponds to one of the input/output processors 15 to 18 that is communicable with the zeroth execution processor unit 10 and that is determined by the above-mentioned dependencies. Therefore, the IOPN register 71 is operable to hold the communicable processor number and may be called a holding register for holding the communicable processor number.

The communicable processor number specifies each input/output processor by a bit position of the logic "1" level assigned to each of the input/output processors 15 to 18. In the example being illustrated, the communicable processor number is represented by four bits arranged from a zeroth or most significant bit to a third or least significant bit. The zeroth through third bits are determined for the zeroth through third input/output processors 15 to 18, respectively. As mentioned before, the zeroth execution processor unit 10 is communicable with the zeroth input/output processor 15 and the communicable processor number must therefore specify the zeroth input/output processor 15. Under the circumstances, the communicable processor number in the zeroth execution processor unit 10 is represented by (1000) having the zeroth bit of the logic "1" level.

In FIG. 4, the IOPN register 71 is composed of zeroth through third bit registers 710 to 713 loaded with the zeroth through third bits (1000) of the communicable processor number, respectively. Likewise, the reception source processor number register 43 is composed of zeroth through third reception registers 430 to 433 which are loaded with the received source processor number RSRC represented by the binary code of (0100), respectively. Under the circumstances, the request judgement circuit 65 judges or checks whether the received source processor number RSRC indicates the zeroth input/output processor 15 specified by the communicable processor number (1000) of the zeroth execution processor unit 10. The request judgement circuit 65 produces an interruption request signal INT when the received source processor number RSRC indicates the zeroth input/output processor 15. The interruption request signal INT is held in an interruption (INT) register 75 and is thereafter sent to the central processing unit 25 through a seventh internal line 77, as shown in FIG. 2.

In this connection, a combination of the reception source processor number register 43 and the request judgement circuit 65 may be called a detection circuit for detecting whether or not the received source processor number RSRC indicates the zeroth input/output processor 15 communicable with the zeroth execution processor unit 10.

More particularly, the request judgement circuit 65 illustrated in FIG. 4 comprises zeroth through third AND gates 80 to 83 connected to the zeroth through third bit registers 710 to 713, respectively, an OR gate 84 connected to the zeroth through third AND gates 80 to 83, and an output AND gate 85 connected to the OR gate 84 and the command decoder 45 through the fourth internal line 64. On the other hand, the zeroth reception register 430 of the reception source processor number register 43 is connected to the output AND gate 85 through a first inverter 86 while the first reception register 431 is connected direct to the output AND gate 85. In addition, the second reception register 432 is connected to the second and the third AND gates 82 and 83 directly and also to the zeroth and the first AND gates 80 and 81 through a second inverter 87. The third reception register 433 is connected to the first and the third AND gates 81 and 83 directly and also to the zeroth and the second AND gates 80 and 82 through a third inverter 88.

With this structure, let the communicable processor number and the received source processor number RSRC be loaded with (1000) and (0100), respectively. In this case, the zeroth AND gate 80 alone is opened to supply the logic "1" level signal to the output AND gate 85 through the OR gate 84. Thus, the received source processor number RSRC is checked by the zeroth through third AND gates 80 to 83 and the second and the third inverters 87 and 88, all of which may be called a checking circuit.

Inasmuch as the output AND gate 85 is supplied with the indication signal of the logic "1" level from the command decoder 45 and with the logic "1" levels from the zeroth reception register 430 through the first inverter 86 and from the first reception register 431, the output AND gate 85 is opened to produce the interruption request signal INT. The interruption request signal INT is sent to the central processing unit 25 through the interruption register 75. Responsive to the interruption request signal INT, the central processing unit 25 recognizes that the communication request in question is sent from the zeroth input/output processor 15 determined for the zeroth execution processor unit 10 by the above-mentioned dependencies.

Thereafter, the zeroth input/output processor 15 transfers a sequence of data signals through the address/data bus 202 to the zeroth execution processor unit 10. The data signal sequence is received by the central processing unit 25 of the zeroth execution processor unit 10 through the second receiver 54 and the reception address/data register 53.

In FIG. 4, the communicable processor number of (1000) may be changed to another under control of the central processing unit 25 to communicate with another one of the input/output processors when the input/output processors increase or decrease in number. For example, when the communicable processor number is changed to (0100), the interruption request signal INT of the logic "1" level is produced from the output AND gate 85 on reception of the received source processor number RSRC represented by (0101). This shows that the illustrated execution processor unit 10 is communicable with the first input/output processor 16 (FIG. 1). Likewise, when the communicable processor number and the received source processor number RSRC be equal to (0010) and (0110), respectively, the second AND gate 82 is opened to produce the interruption request signal INT through the output AND gate 85. In addition, the request judgement circuit 65 illustrated in FIG. 3 can produce the interruption request signal INT when the communicable processor number and the received source processor number RSRC are equal to (0001) and (0111), respectively.

With this structure, no destination processor number DEST may be produced from each input/output processor 15 to 18 on the third communication, although description has been made on the assumption that the destination processor number is sent from each input/output processor as a dummy number. Accordingly, it is unnecessary to monitor or administrate the primary processor numbers of the execution processor units. This means that each input/output processor may not be aware or conscious of the primary processor numbers. This enables alleviation of a burden imposed on hardware or firmware of each input/output processor.

While this invention has thus far been described in conjunction with a preferred embodiment thereof, it will readily be possible for those skilled in the art to put this invention into practice in various other manners. For example, the upper and the lower rank processors may not be restricted to the execution processor units and the input/output processors. In addition, this invention may be applied to intercommunication between processors of the same rank. No dummy number may be sent from the transmission source to the reception end.

What is claimed is:

1. An intercommunication network for use in carrying out communication among a plurality of processors, said processors being connected to one another through a system bus and comprising transmission and destination processors which are identified by first and second preassigned processor numbers, respectively, and which are operable as a transmission source on transmission of a transmission request and as a destination end for receiving said transmission request, respectively, wherein said transmission processor comprises:
producing means for producing said preassigned processor number assigned to said transmission processor; and
sending means coupled to said producing means for sending said first preassigned processor number as a transmission source number to said system bus on transmission of said transmission request with said second preassigned processor number not being sent to identify said destination end;
said destination processor comprising:
holding means for holding a communicable processor number which is given to said destination processor and which corresponds to said first preassigned processor number;
processing unit means for carrying out processing in response to an interruption request signal;
detecting means coupled to said system bus and said holding means for detecting whether or not said transmission source number indicates said transmission processor by checking correspondence between said transmission source and said communicable processor number; and
means for supplying said interruption request signal to said processing unit means when both said transmission source number and said communicable processor number indicate said transmission processor.

2. An intercommunication network as claimed in claim 1, wherein said transmission and said destination processors are an input/output processor and an execution processor unit, respectively.

3. An intercommunication network as claimed in claim 1, wherein said transmission source number is represented by a binary code of a predetermined number of bits while said communicable processor number is represented by a binary code which is different from said binary code of the transmission source number and which has a single bit position of a logic "1" level preassigned to said transmission processor.

4. An intercommunication network as claimed in claim 3, wherein said holding means holds said communicable processor number having the logic "1" level at said bit position preassigned to said transmission processor;
said detecting means comprises:
register means for retaining said binary code representative of said transmission source number;
checking means coupled to said holding means and said register means for checking whether or not both the communicable processor number and said binary code of the transmission source number specify said transmission processor; and
signal producing means coupled to said checking means for producing said interruption request signal when said transmission processor is specified by both said communicable processor number and said binary code of the transmission source number.

* * * * *